US010654326B2

(12) United States Patent
Tozer et al.

(10) Patent No.: US 10,654,326 B2
(45) Date of Patent: May 19, 2020

(54) TOW COUPLING

(71) Applicant: AERO-TECH PTY LTD., Nunawading, Victoria (AU)

(72) Inventors: Warwick Brook Tozer, Brighton (AU); Cameron Ronald Tozer, Strathewen (AU)

(73) Assignee: AERO-TECH PTY LTD., Nunawading, Victoria (AU)

(*) Notice: Subject to any disclaimer, the term of this patent is extended or adjusted under 35 U.S.C. 154(b) by 164 days.

(21) Appl. No.: 15/737,982

(22) PCT Filed: Jun. 24, 2016

(86) PCT No.: PCT/AU2016/050544
§ 371 (c)(1),
(2) Date: Dec. 19, 2017

(87) PCT Pub. No.: WO2016/205893
PCT Pub. Date: Dec. 29, 2016

(65) Prior Publication Data
US 2018/0297428 A1 Oct. 18, 2018

(30) Foreign Application Priority Data

Jun. 26, 2015 (AU) .................... 2015902479

(51) Int. Cl.
*B60D 1/46* (2006.01)
*B60D 1/06* (2006.01)
(Continued)

(52) U.S. Cl.
CPC ............... *B60D 1/46* (2013.01); *B60D 1/025* (2013.01); *B60D 1/06* (2013.01); *B60D 1/167* (2013.01); *E01H 1/105* (2013.01)

(58) Field of Classification Search
CPC .......... B60D 1/46; B60D 1/025; B60D 1/167; B60D 1/06; E01H 1/105
(Continued)

(56) References Cited

U.S. PATENT DOCUMENTS 4,113,272 A * 9/1978 Sebby ................... B60D 1/465
280/402
5,226,657 A 7/1993 Dolphin
(Continued)

FOREIGN PATENT DOCUMENTS

DE   20 2004 008 125 U1   7/2004
DE      202004008125 U1 * 7/2004 ............... B60D 1/46

OTHER PUBLICATIONS

The FOD Boss Brochure [retrieved from internet on Jul. 19, 2016], <URL: http://www.aerosweep.com/pdfs/FOD_Boss Brochure.pdf> published on Feb. 27, 2016 as per Wayback Machine.
(Continued)

*Primary Examiner* — Jacob D Knutson
*Assistant Examiner* — Felicia L. Brittman
(74) *Attorney, Agent, or Firm* — Sughrue Mion, PLLC

(57) ABSTRACT

Tow coupling (100) having a tow coupling part (128) for fitment to a tow ball (104) of the vehicle, a load coupling (190) for coupling to a load to be towed, and a tow element (180) pivotally connecting to the tow coupling part (128) and to the load coupling part (190). Pivoting of the tow element (180) with respect to the tow coupling part (128) varies the vertical position of the load coupling part (190). Positioning structure (220), between the tow coupling part (128) and the tow element (180) permits setting that position. The positioning structure (220) is resiliently biased by a spring (260) so as to resiliently bias the tow element (180) such that the load coupling (190) assumes a selectable set position, from which the load coupling (190) is however upwardly displaceable under pivoting of the tow element (180) against that resilient bias.

32 Claims, 12 Drawing Sheets

(51) Int. Cl.
  *B60D 1/02* (2006.01)
  *B60D 1/167* (2006.01)
  *E01H 1/10* (2006.01)

(58) Field of Classification Search
  USPC .................................. 172/193; 280/490.1
  See application file for complete search history.

(56) References Cited

U.S. PATENT DOCUMENTS

| | | | | |
|---|---|---|---|---|
| 5,364,117 | A * | 11/1994 | Keith ..................... | B60D 1/07 280/442 |
| 5,465,992 | A | 11/1995 | Anderson | |
| 6,010,080 | A * | 1/2000 | Marchand ........... | A01M 7/0053 212/180 |
| 6,042,137 | A * | 3/2000 | McIntosh ................ | B60D 1/07 280/462 |
| 6,877,758 | B2 * | 4/2005 | Colistro ................ | B60D 1/075 180/14.4 |
| 2006/0230557 | A1 | 10/2006 | Zellefrow et al. | |
| 2009/0008905 | A1 | 1/2009 | Bryce | |
| 2012/0112434 | A1 * | 5/2012 | Albers .................. | B60D 1/065 280/507 |
| 2014/0346755 | A1 | 11/2014 | Svihla | |

OTHER PUBLICATIONS

International Search Report for PCT/AU2016/050544 dated Jul. 29, 2016.

\* cited by examiner

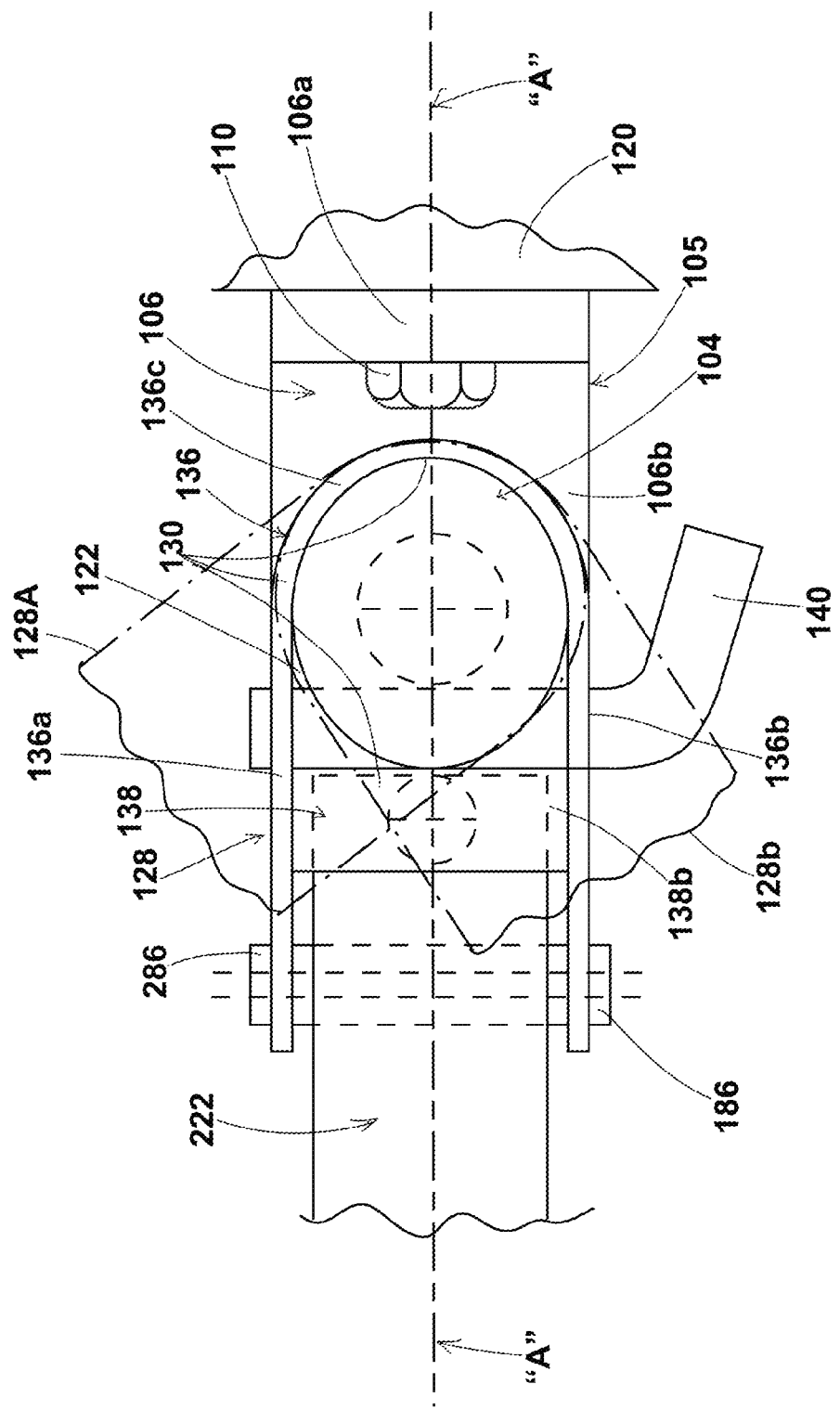

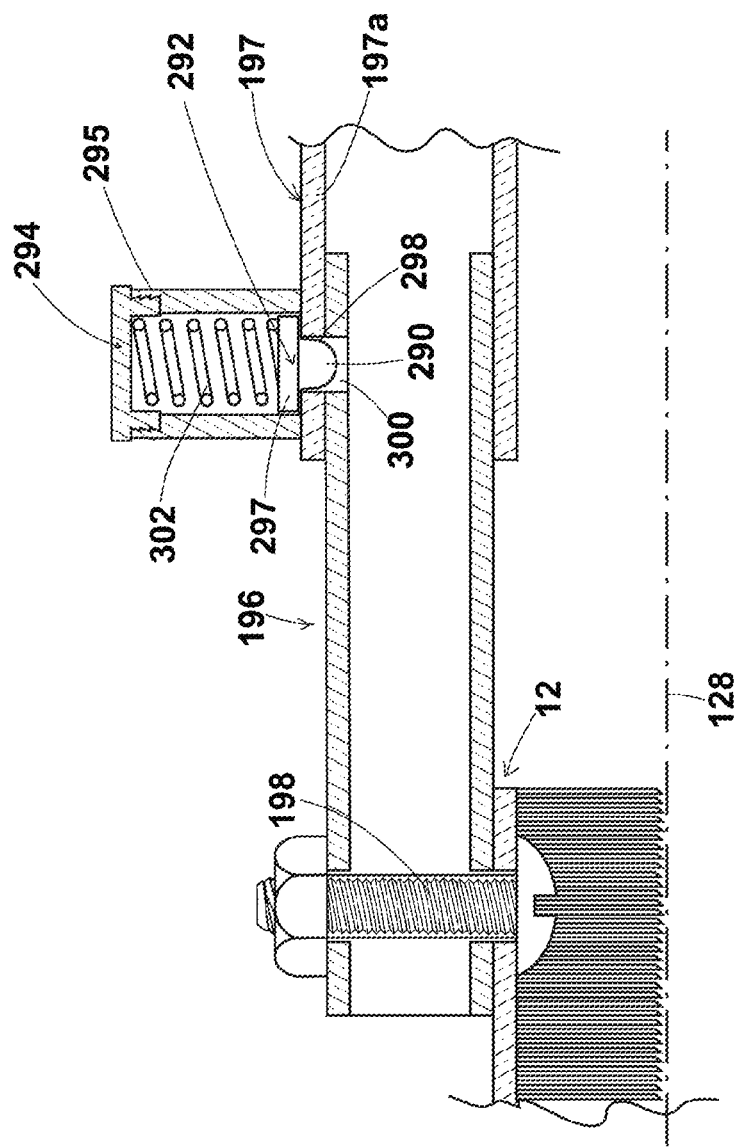

TOW COUPLING

CROSS REFERENCE TO RELATED APPLICATIONS

This application is a National Stage of International Application No. PCT/AU2016/050544 filed Jun. 24, 2016, claiming priority based on Australian Patent Application No. 2015902479 filed Jun. 26, 2015, the contents of all of which are incorporated herein by reference in their entirety.

FIELD OF THE INVENTION

This invention relates to a tow coupling.

BACKGROUND OF THE INVENTION

For towing trailers, by vehicles, use is generally made of ball type couplings having a tow ball mounted to the vehicle and cooperating tow coupling attached to the trailer. The coupling couples to the ball in a manner enabling a substantial degree of rotational movement of the coupling and trailer relative to the vehicle and about the upright vertical axis of the ball. This assists in manoeuvring the vehicle and trailer around corners. A substantial degree of such rotational movement about a horizontal axis is also permitted, of assistance for example in traverse of the vehicle and trailer over road humps and dips.

In some applications however, it may be undesirable to permit free relatively free rotational movement between the ball and coupling. The following publications, for example, describe devices for collecting debris from a ground surface:

International Patent Application No. PCT/AU2005/000692;

International Patent Application No. PCT/AU1995/00629;

International Patent Application No. PCT/AU1998/00001;

International Patent Application No. PCT/AU2008/001252;

International Patent Application No. PCT/AU2009/000149.

The disclosures of these are herby incorporated to form part of the disclosure of this application.

These devices are in the form of a generally planar structure which is towed over the ground surface such that debris on the ground surface moves upwardly through apertures in the structure to be deposited on an upper collection surface of it. While it is possible to use any conventional method of coupling these structures to vehicles, for towing, such as to use ball couplings as mentioned, it has been found that efficiency of collection may be improved by at least biasing e.g. the leading edge of the structure to a relatively fixed location with respect to the ground surface rather than permitting relatively free movement as occurs with ball-type couplings as described.

SUMMARY OF THE INVENTION

According to the present invention there is provided a tow coupling for fitting to an axially extending ball coupling mountable to a vehicle such that the axis of the ball coupling is upright with a ball of the ball coupling uppermost, the tow coupling having:
an engagement part for engagement with the tow ball,
a load coupling for coupling to a load to be towed, and
a tow element interconnecting the engagement part and the load coupling and pivotally connected to the engagement part and to the load coupling,
latching means for latching the engagement part in said engagement with the tow ball,
said latching means for latching the engagement part in said engagement with the tow ball whereby to substantially confine movement of the coupling part when engaged with the tow ball to movement about said axis,
interconnections between the load coupling and the tow element and between the engagement part and the tow element permitting pivoting, about transverse axes, between the load coupling and the tow element and between the engagement part and the tow element, and
a positioning structure for positioning the tow element in a settable pivotal position with respect to the engagement part such that, when the engagement part is coupled to interconnect said vehicle and load, the pivotal position of the interconnection between the tow element and the load coupling is settable in the upright direction.

The invention also provides a tow coupling having an engagement part for engaging an upright ball coupling of a tow vehicle, to substantially confine movement of the tow coupling to movement about an upright axis of the ball coupling, a tow element pivotally connected to the engagement part and pivotally connected to an engagement structure connecting the tow element to a load to be towed, and positioning structure for positioning the engagement structure at a selectable vertical position when the engagement part is engaged with the ball coupling.

The invention also provides a vehicle having attached thereto a tow coupling for coupling a debris collection device to the vehicle for towing the debris collection device over a ground surface to collect debris from the ground surface, the tow coupling having a tow element pivotally mounted with respect to the vehicle in a manner substantially limiting pivotal movement of the tow element to movement about a vertical axis, the tow coupling having, at an end of the tow element remote from the vehicle, a load coupling for connection to the debris collection device, the tow coupling having positioning structure for positioning the tow element vertically, whereby to selectively set the vertical position of the load coupling.

The invention also provides a vehicle having attached thereto a tow coupling for coupling a load to the vehicle for towing the load over a ground surface, the tow coupling having a tow element pivotally mounted with respect to the vehicle in a manner substantially limiting pivotal movement of the tow element to movement about a vertical axis, the tow coupling having, at an end of the tow element remote from the vehicle, a load coupling for connection to the load, the tow coupling having positioning structure for positioning the tow element vertically, whereby to selectively set the vertical position of the load coupling.

The invention also provides tow coupling for fitting to an axially extending ball coupling mountable to a vehicle such that the axis of the ball coupling is upright with a ball of the ball coupling uppermost, the tow coupling having:
an engagement part for engagement with the tow ball,
a load coupling for coupling to a load to be towed, and
a tow element interconnecting the engagement part and the load coupling and pivotally connected to the engagement part,
latching means for latching the engagement part in said engagement with the tow ball, an interconnection between the engagement part and the tow element permitting pivoting, about a transverse axis, between the engagement part and the tow element, and a positioning structure for positioning the tow element in a settable pivotal position with respect to the engagement part such that, when the engagement part is engaged with the tow ball, the position of the load coupling is settable in the upright direction dependent on the settable pivotal position of the tow element.

The invention is further described by way of example only with reference to the accompanying drawings.

BRIEF DESCRIPTION OF THE DRAWINGS

FIG. 11 is a plan view of the engagement part of FIG. 9 and interconnected ball coupling on a vehicle; and FIG. 12 is a view corresponding to part of FIG. 7, but illustrating a modification.

DETAILED DESCRIPTION OF THE PREFERRED EMBODIMENTS

Figure 1:
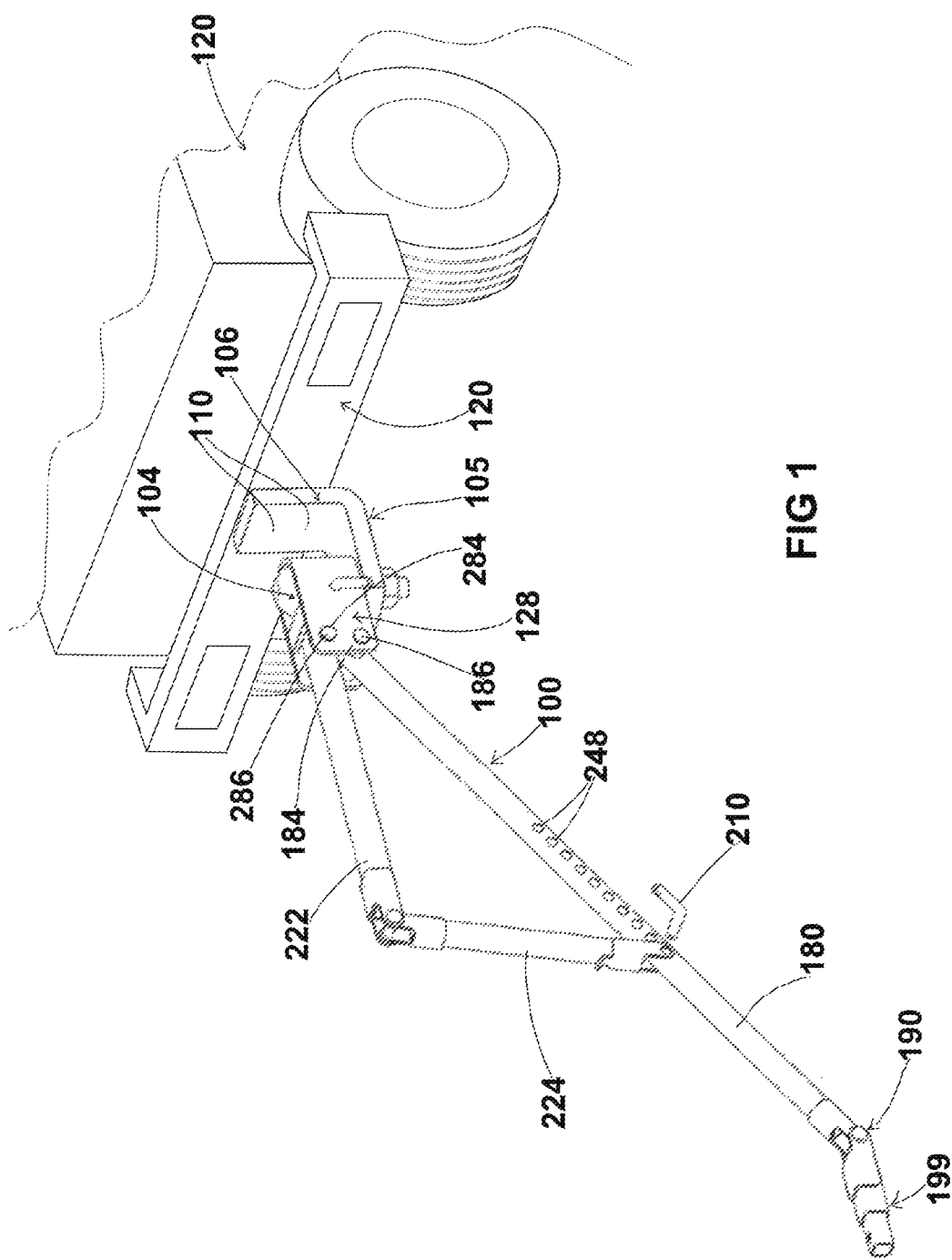
FIG. 1 is a perspective view showing a tow coupling formed in accordance with the invention and a ball coupling of a vehicle to which the tow coupling is attached to the vehicle.
Figure 2:
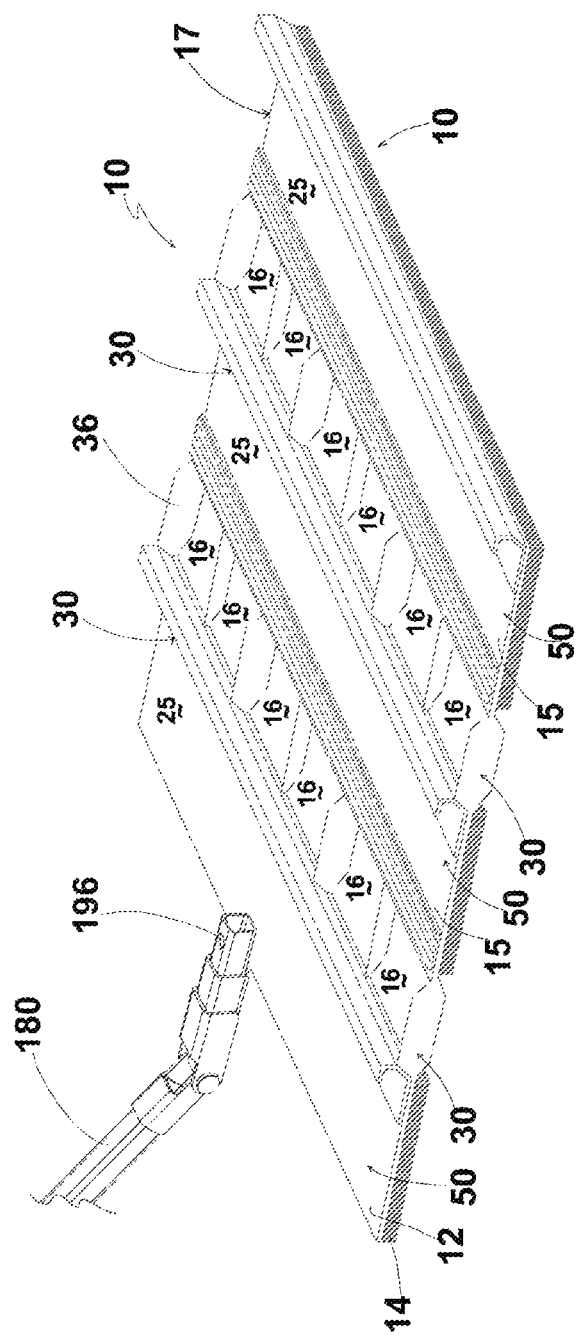
FIG. 2 is a perspective view of a debris collection device and part of the tow coupling of FIG. 1 attached thereto.
Figure 3:
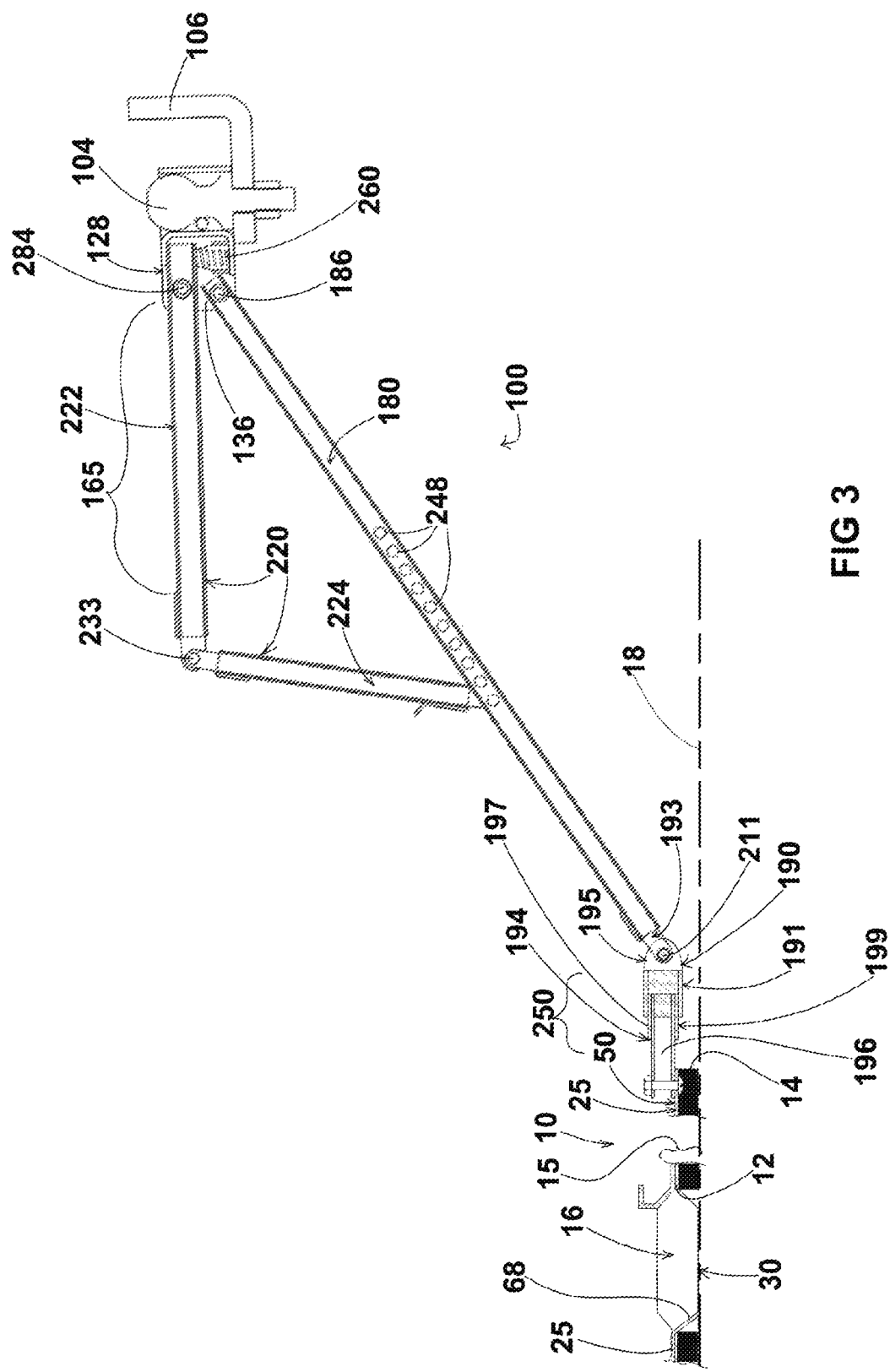
FIG. 3 is a vertical sectional view of the tow coupling and ball coupling of FIG. 1.

The tow coupling 100 shown in FIG. 1 is intended to couple a debris collection device 10, FIG. 2, to a vehicle 102, at a tow ball 104 of a ball coupling 105 attached to the rear of the vehicle, for towing the device 10 over a ground surface 18, FIG. 3, so that debris on the ground surface is collected by the device 10.

The device 10 in this instance is of form described in international application PCT/AU2009/000149. As shown in FIG. 2, device 10 it is formed as a flexible generally planar member 17 having sections 50 formed from conformable matting 15 having a flexible laminar base portion 12 with depending bristles 14. There are three sections 50 arranged at lengthwise spaced locations, separated by two transverse frame structures 30. The matting 15 is formed from inverted artificial grass material of the kind used for the surfaces of tennis courts and the like, arranged with the bristles extending downwardly, and, in use, lying on the ground surface 18.

Figure 7:
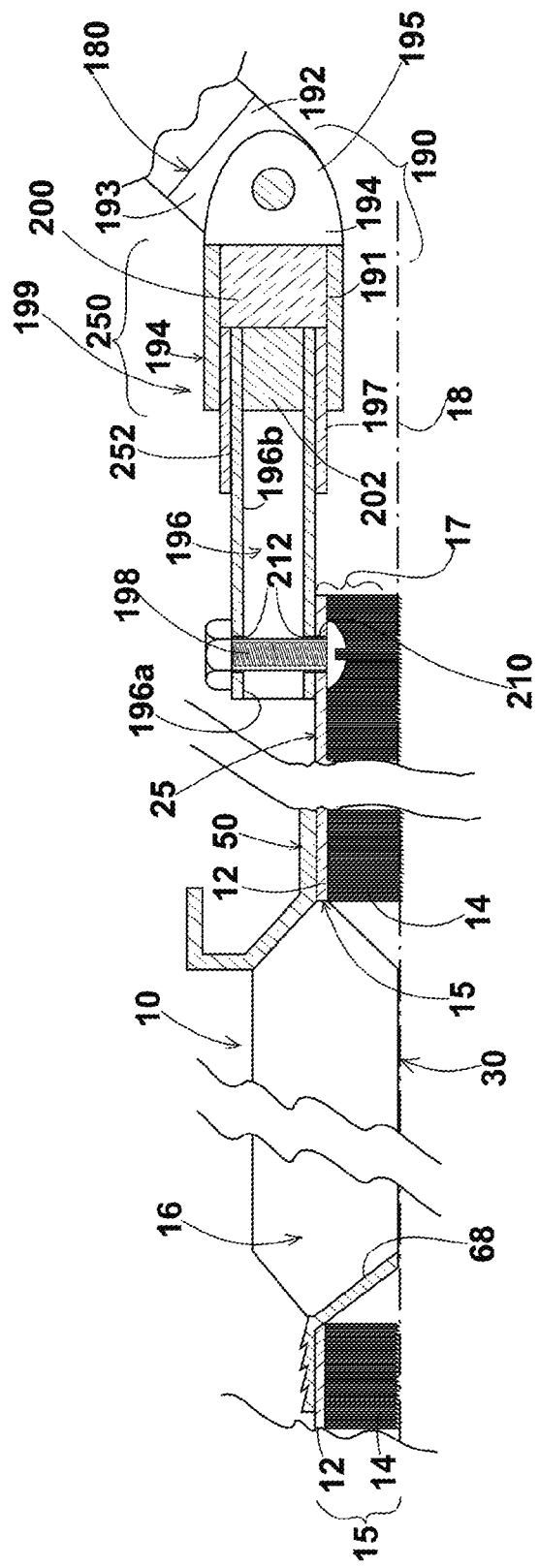
FIG. 7 is an enlarged fragmentary vertical section of a forward part of the debris collection device of FIG. 2 and the rear part of the tow coupling of FIG. 1, illustrating the manner of interconnection of the debris collection device and the tow coupling.

The device 10 has rectangular sidewardly elongate openings 16, there being a respective transversely extending row of the openings defined by each frame structure 30. When the device 10 is moved over a ground surface 18, by towing, the bristles 14 agitate loose debris such as leaves, stones and the like on the ground surface by contact therewith and this debris tends to pass from the underside of the device 10 through the openings 16 to rest on upper collection surfaces 25 of sections 50. The action is facilitated by the presence of inclined pick-up surfaces 68 at the rear edges of the openings 16, these, as shown in FIGS. 3 and 7, extending upwardly and rearwardly, from locations in use close to the ground surface 18, to the collection surfaces 25. The debris so directed to the collection surfaces 25 can then be conveniently taken away on the device for disposal as desired.

Figure 9:
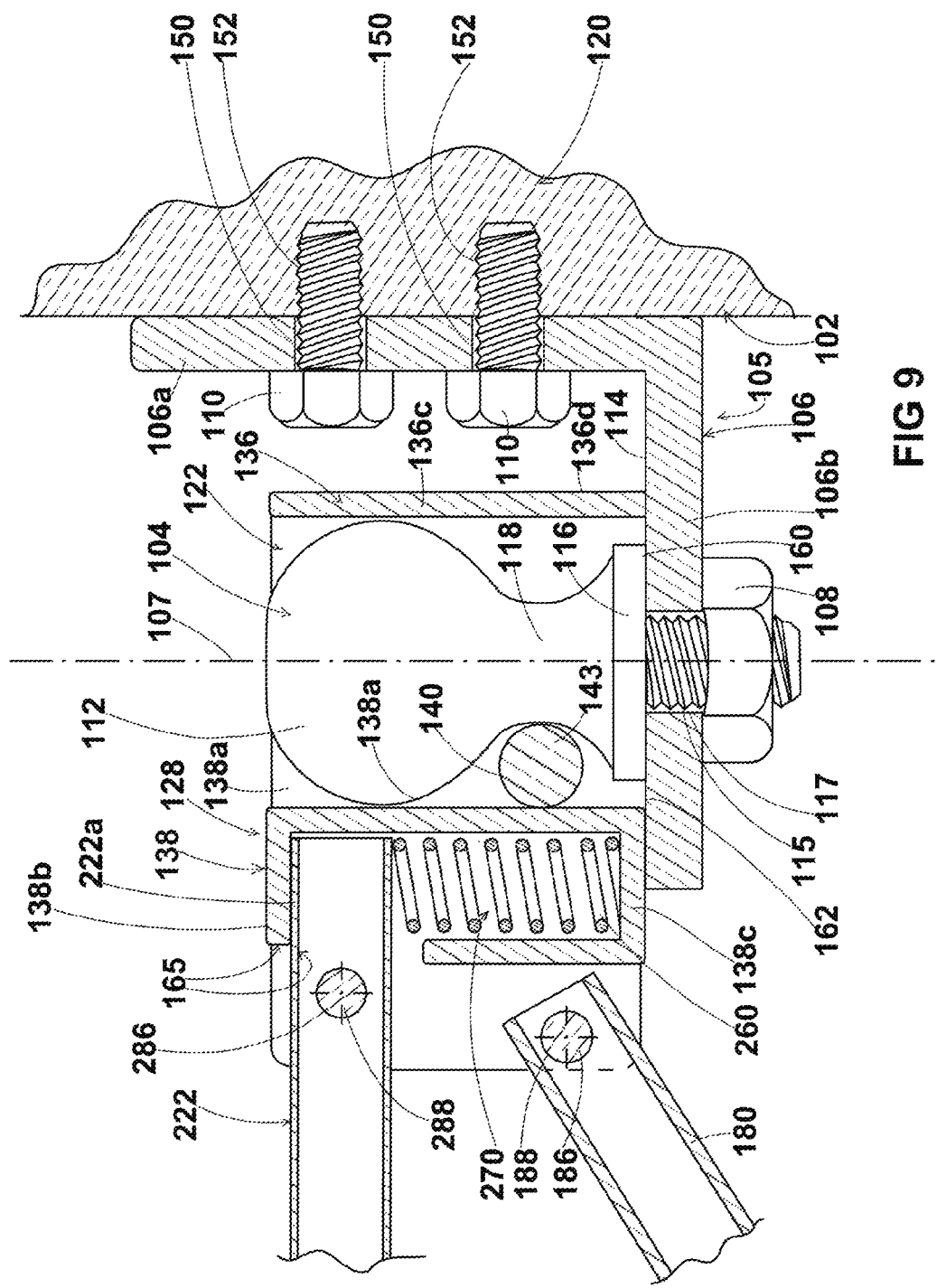
FIG. 9 is an enlarged vertical section, on a front to rear extending upright plane, of an engagement part of the tow coupling of FIG. 1, in a condition of the tow coupling corresponding to that in FIG. 3.
Figure 10:
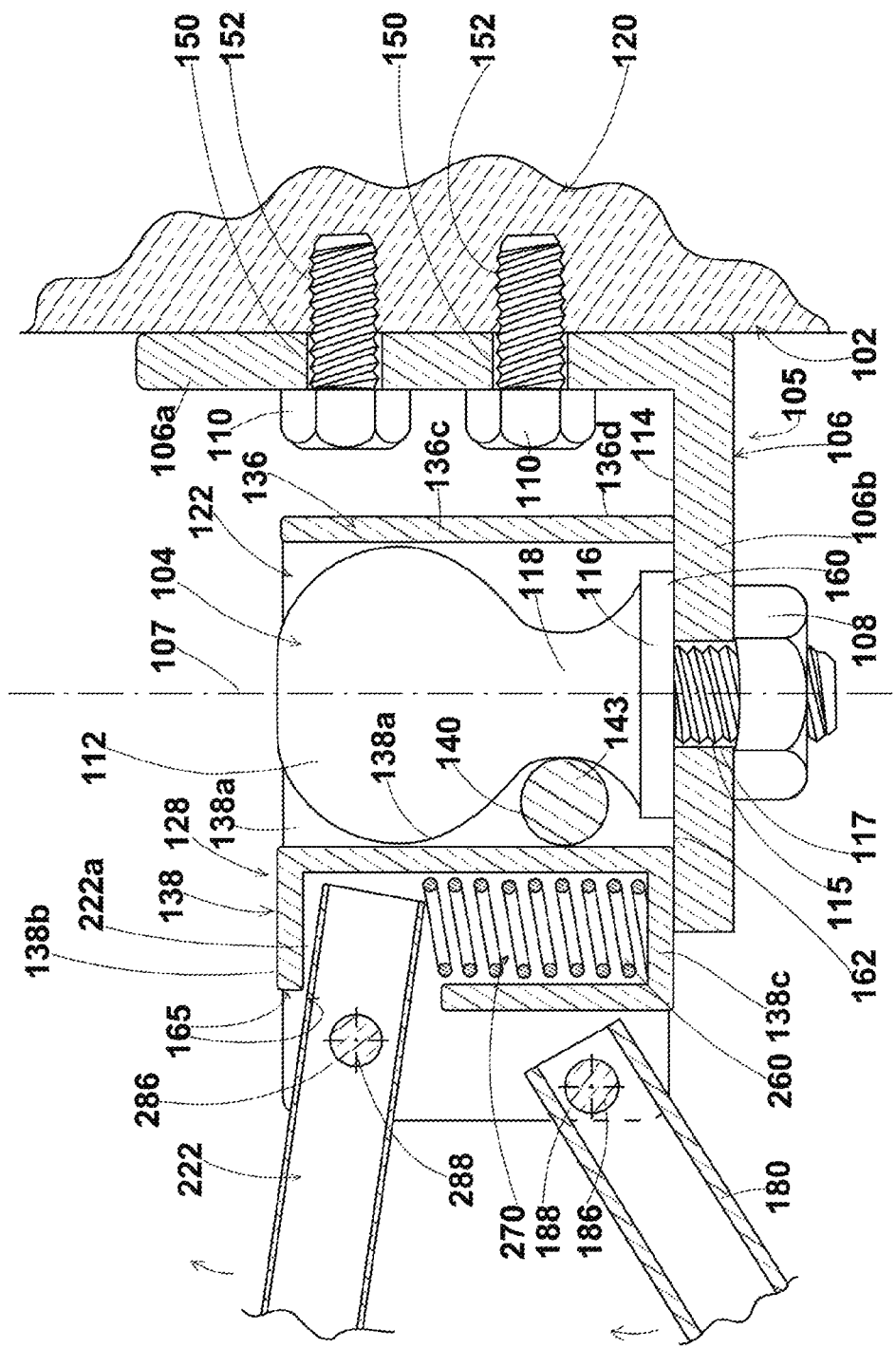
FIG. 10 is a view like that of FIG. 9, but showing the engagement part in a condition of the tow coupling corresponding to that in FIG. 8.

Referring to FIGS. 9 and 10 in particular, ball coupling 105 includes a bracket 106 affixed to the rear of the vehicle 102, and which carries the tow ball 104 of the ball coupling 105. Tow ball 104 is disposed with its axis 107 upright. It has an uppermost substantially spherical ball section 112 and a lower outwardly extending peripheral flange 116 interconnected with the lower end of the ball section 112 by an intermediate narrowed neck section 118. Bracket 106 is L-shaped, having an upright part 106a connected, by bolts 110, in this case, to a transverse rear member 120 of the vehicle, FIGS. 1, 9 and 10. The bolts 110 extend through openings 150 in upright part 106a and into threaded openings 152 in member 120 of vehicle 102.

A generally horizontal part 106b of the bracket 106 extends rearwardly from the lower edge of the upright part 106a and carries the tow ball 104, secured to the upper surface 114 of the horizontal part 106b by a depending threaded shank 115 on the tow ball 104, extending downwardly from flange 116 through an aperture 117 in the part 106b. A nut 108 is threadedly received on the threaded shank 115 and is tightened against the underside of part 106b to securely clamp the tow ball 104 to the part 106b with flange 116 against the upper surface 114 of part 106b.

Tow coupling 100 includes an engagement 128 part for engaging the tow ball 104 and removably mounting the coupling 100 to the tow ball 104. For this engagement, the tow ball 104 is received in an upright opening 122 of the engagement part 128, defined by a peripheral wall 130 (FIG. 11) of the engagement part 128. Wall 130 is made up of parts of a generally U-shaped bracket 136 and a transversely extending member 138 received in the bracket 136 and secured as by welding to the bracket 136 to extend between parallel opposed wall sections 136a, 136b of bracket 136. Opposed lateral parts of wall 130 are defined by the parallel opposed upright wall sections 136a, 136b of bracket 136. A forward transverse part of wall 130 is defined by an upright, curved, transverse wall section 136c of bracket 136 (FIG. 11). A rear transverse part of wall 130 is defined by a transverse upright wall part 138a of member 138 (FIGS. 9 and 10), which extends between and is secured to wall parts 136a and 136b.

The cross-sectional dimensions of the opening 122 are such that the engagement part 128 can be engaged with the tow ball 104 by downwards movement of the engagement part such that the tow ball 104 passes into the opening 122. Thus, the distance between inner surfaces of the wall sections 136a, 136b is only slightly greater that the diameter of tow ball 104 at the ball section 112, and the part 136c of is of semi-circular form, with a radius of curvature at the inner surface thereof only slightly greater than the radius of the ball section 112. The wall part 138a is essentially linear, the distance between the inner surface of this and the inner surface of the wall section 136c, at the upright plane passing through the ball axis and the forward most location of the inner surface of the wall section 136c, is likewise slightly greater than the ball diameter.

Once positioned over the tow ball 104, the engagement part 128 is retained on the tow ball 104 by a removable transverse latching element 140. Thus, the wall sections 136a, 136b have therethrough respective transversely aligned openings 143 (FIGS. 9, 10) immediately in front of the upright wall part 138a and at lower locations on the wall sections 136a, 136b. The latching element 140 is removably received in these so as to extend between the wall sections 136a, 136b. The location of the openings 143, and thus the location of the latching element 140, is such that the latching element extends, at an underside hemisphere of the ball section 112, so that there is a clearance fit only between the latching element 140 and the tow ball 104. The latching element 140 may, e.g., have a shank portion which is passed through the opening 143 in one wall section 136a, 136b and having a threaded end which is then threadedly engaged with an internal thread of the opening 143 in the other wall section 136b, 136a. Additionally, or alternatively, the latching element 140 may have at one or each end an opening to receive a split pin for retaining the latching element 140 in position.

The engagement part 128 couples to tow ball 104 in a fashion permitting relatively free rotational movement of the engagement part about the upright axis 107 of ball coupling 105 and thus of ball section 112, but pivotal movement of the engagement part 128 about a side to side, horizontal, axis of the ball section 112 is substantially precluded. In the condition where the tow ball 104 is retained in the engagement part 128, the lower edge 136d of the bracket 136 substantially engages the upper surface 114 of part 106b of bracket 106, so that the engagement part 128 substantially rests on the bracket. This engagement occurs at locations forwardly of the upright axis of the tow ball 104 and also rearwardly of that axis, such as at locations 160, 162 indicated in FIGS. 9 and 10. In consequence, although some degree of rotation might otherwise be permitted under relative rotational movement of the latching element 140 around the mentioned horizontal axis of the tow ball 104, that movement is restricted by the inability of the latching element 140 to move upwardly or downwardly, relatively, to any significant extent; this arises because it that would involve direct vertical relative movement, however substantially precluded by capture of the latching element 140 between the flange 116 of tow ball 104 and the underside of the ball section 112 of the tow ball. Similarly, the capture of the tow ball 104 by the latching element 140 substantively precludes rotational movement between the ball and latching element about an axis extending lengthwise of ball coupling 105. This arises because of engagement of the lower edge 136d of bracket 136 with the horizontal part 106b of the bracket 106, at locations to either lower side of the tow ball 104.

Figure 4:
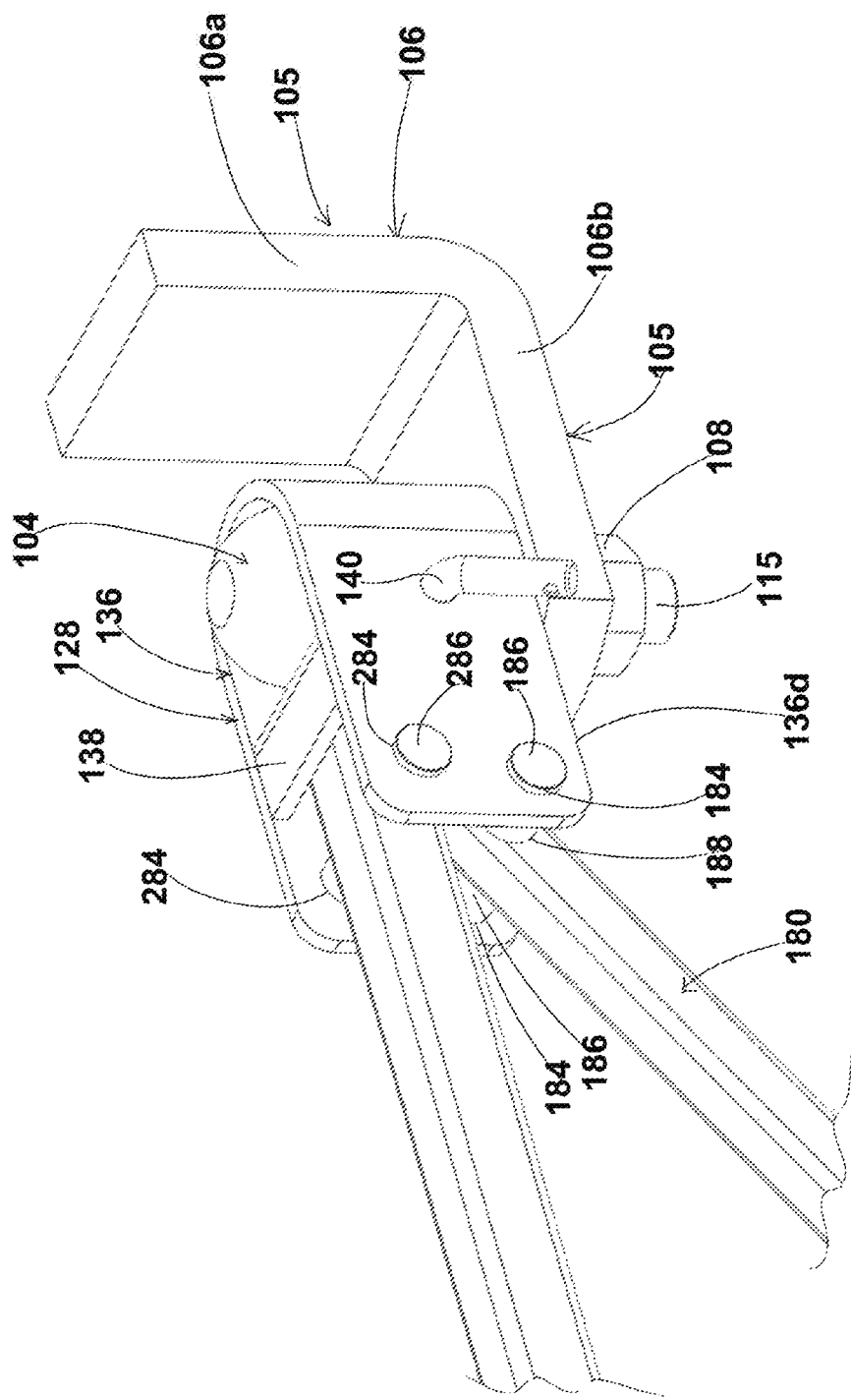
FIG. 4 is an enlarged fragmentary perspective view of a forward part of the tow coupling of FIG. 1.

A tow element 180 of tow coupling 100 is pivotally attached at one end to the engagement part 128. Thus, the parallel wall sections 136a, 136b of bracket 136 extend rearwardly past member 138, and a forward end of the tow element 180 is interconnected with the trailing end of the bracket 136 by a transverse pin 186 which extends between the wall sections 136a, 136b, being fixedly secured in transversely aligned receiving openings 184 (FIGS. 9, 10) in each wall section 136a, 136b. The pin 186 extends through transversely aligned openings 188 (FIG. 4) in the tow element 180 so as to be retained between the wall sections 136a, 136b, for pivotal movement of the forward end of the tow element 180 about the axis of pin 186, horizontal in the condition for use of the coupling 100.

Figure 5:
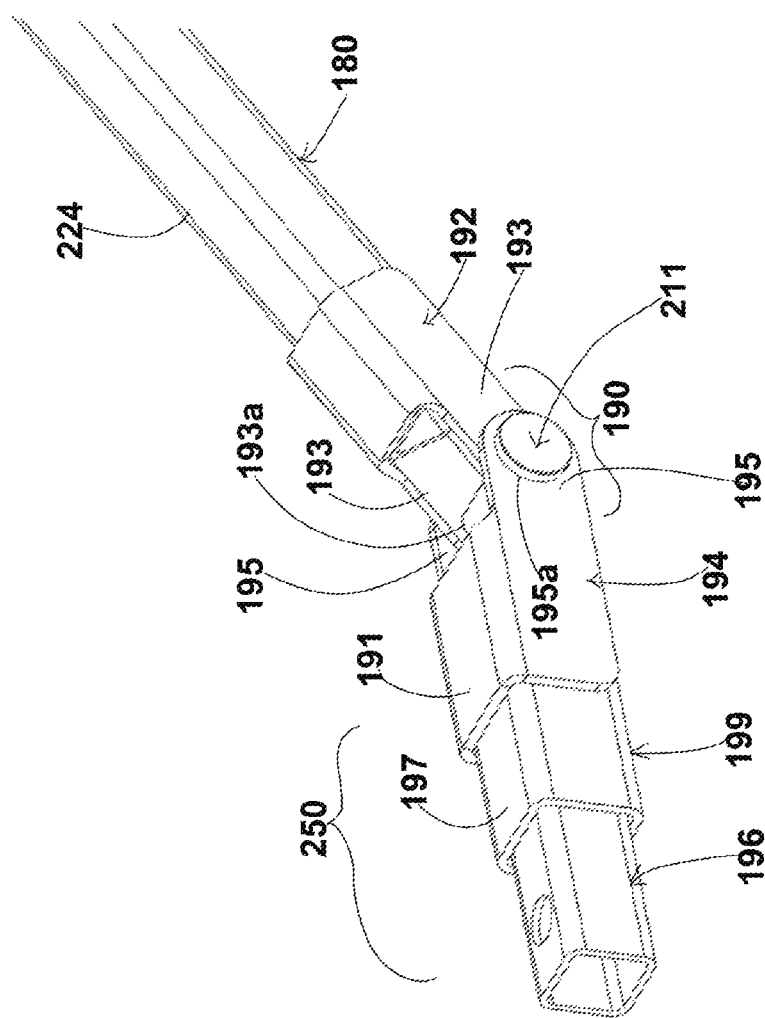
FIG. 5 is an enlarged fragmentary perspective view of a rear part of the tow coupling of FIG. 1.

Tow element 180 extends downwardly and rearwardly from the engagement part 128 to a lower, trailing, end which is pivotally attached to an engagement structure 199 for coupling to device 10 by a load coupling 190 (FIG. 5). Coupling 190 includes coupling parts 192, 194. Coupling part 192 is attached to the lower, trailing, end of the tow element 180. Coupling part 194 is attached to the forward end of engagement structure 199 (FIG. 5). The lower end of tow element 180 has parallel opposed flanges 193 and the coupling part 194 has opposed forwardly extending parallel flanges 195. Flanges 193 are positioned between flanges 195 and are adjacent respective ones of flanges 195. A transverse pin 211 extends through transversely aligned openings 193a in flanges 193 and transversely aligned openings 195a in flanges 195. Tow element 180 and load coupling 190 are thus coupled for relative pivotal movement about the transverse axis of pin 211, horizontal in the condition for use of the coupling 100.

The flanges 195 of coupling part 194 are formed on a tubular element 191 of the load coupling 190. Another tubular element 197 of load coupling 190 is received in and fixed to the element 191, to extend rearwardly therefrom.

An elongate tubular engagement element 196 is affixed the forward end of device 10, centrally in the side to side direction, so as to extend forwardly from the planar member 17. Thus, a rearward end 196a of the element 196 is secured to the upper surface of the planar member 17 of device 10, particularly at an upper surface of a forward-most section 50 thereof. This securement is effected by a bolt 198 (FIG. 7) extending upwardly through an opening 210 in that section 50, and through vertically aligned openings 212 in the rearward end 196a of element 196. From the planar member 17, the element 196 extend forwardly, at a forward end 196b thereof to be received in a rearwardly open recess 252 in the coupling part 192, the rear end of which is defined by the interior of tubular element 197, and is a clearance fit in the tubular element 197.

The element 196 and engagement structure 199 are magnetically attached to each other by means of permanent magnets 200, 202, respectively at a forward location within recess 252 and at a forward end of the element 196. In order to engage the coupling parts 192, 194, relative movement of these is effected such that the element 196 is entered into the recess 252 until a forward face of magnet 202 is brought into engagement with the rearward face of the magnet 200. These faces are each perpendicular to the then common axis of element 196 and engagement structure 199 so that these faces engage substantially fully with each other. The polarities of the magnets 200, 202, at the respective so-engaging faces of the magnets, are opposite so that these are magnetically attracted into engagement whereby there is provided a magnetic coupling between the parts 192, 194 and thus between the device 10 and, via the tow coupling 100, vehicle 102. This coupling permits free rotation about the transverse axis of pin 186 between the tow element 180 and engagement part 128.

Free rotation of tow element 180, about the transverse axis of pin 186 at engagement part 128, is however restricted by a positioning structure 220 of the tow coupling 100 extending between engagement part 128 and tow element 180 (e.g., FIG. 3). This includes first and second arms 224, 222. A forward end of the second arm 222 is positioned between the parallel wall sections 136a, 136b of bracket 136. That end is pivotally attached to the bracket 136 by a pin 286 extending transversely through aligned openings 284 in wall sections 136a, 136b and through aligned openings 288 in the second arm 222.

Figure 6:
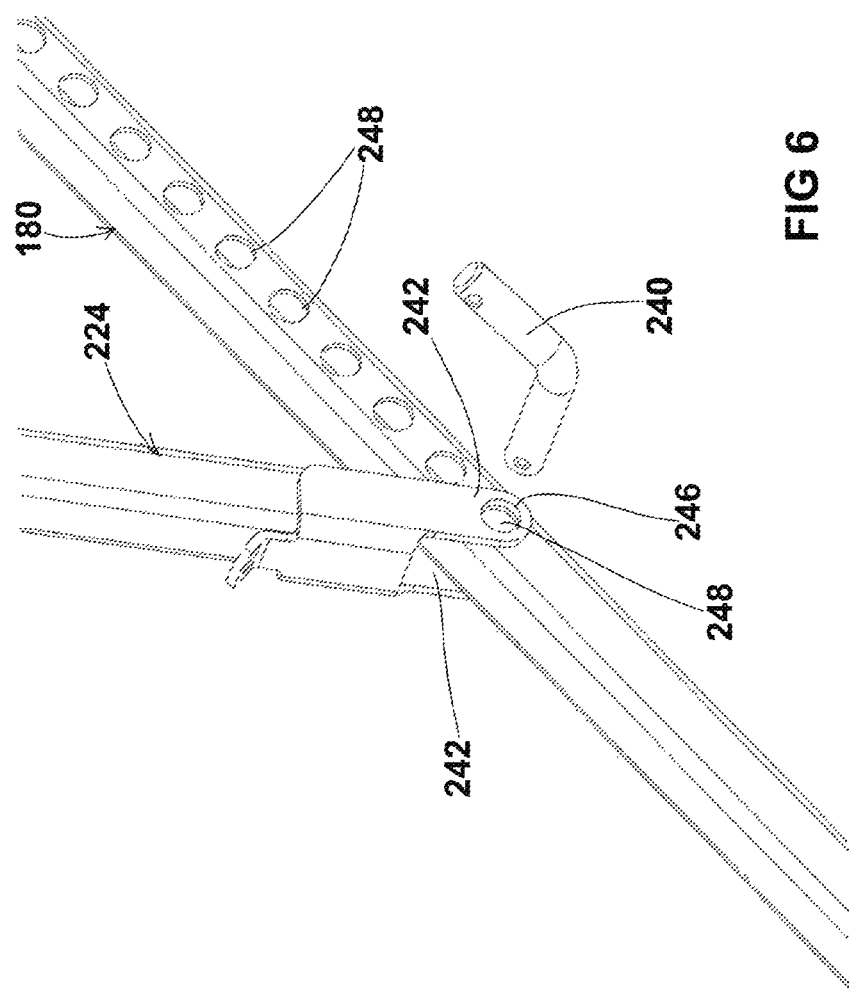
FIG. 6 is an enlarged fragmentary perspective view of an intermediate part of the tow coupling of FIG. 1.

The first arm 224 of positioning structure 220 is pivotally attached, at a forward end thereof, to the rearward end of the second arm 222, by means of a pin 233 passing through flanges of these at adjacent end portions thereof. The flanges may be similar to the described flanges 193, 195, for example. The rear, trailing end of the first arm 224 is pivotally attached to the tow element 180 by a transverse pin 240 extending through aligned transverse openings 246 (FIG. 6) in opposed end flanges 242 at that end of the first arm 224, one to either side of the two element 180, and a selectable one of a plurality of spaced transverse openings 248 through the tow element 180 at lengthwise spaced locations on the tow element 180 between the ends of the tow element 180.

The location of the transverse axis of pin 286 interconnecting arm 222 to coupling part 128 is above and slightly forwards of the location of the pin 186 interconnecting tow element 180 with coupling part 128. Second arm 222 has an end part 222a extending forwardly from the axis of pin 286. Resilient means 270 in the form of a helical compression spring 260 is positioned between that end part 222a and a rearwardly projecting lower flange 138c of member 138. This spring rotationally biases the arm 222, anti-clockwise as viewed in FIGS. 3, 9 and 10, to a limit rotational position at which end part 222a engages the underside of an upper, rearwardly extending flange 138b of member 138. At this rotational position, the interconnection between arms 222 and 224, at pin 233, is biased, clockwise as viewed in FIG. 3, to a particular rotational location and, correspondingly, the rearwards end of the first arm 224 acts on the tow element 180, at the pivotal connection therebetween provided by pin 240, so that the rearward, lower, end of tow element 180 is located at a particular vertical position. That position is dependent on the particular one of the openings 248 in the tow element 180 at which pin 240 couples the first arm 224 and tow element 180. That is, if a more forward one of those openings is selected, the tow element 180 will be positioned, rotationally with respect to pin 240, such that the lower end of the tow element 180 is at a relatively lower position than if an opening more rearward is chosen. The forward end of the device 10 is correspondingly vertically positioned according to the vertical position of the lower, rearward end of tow element 180, since the latter is connected as mentioned to the device 10.

Thus, by appropriate selection of the particular location along the length of tow element 180 at which the first arm 224 of structure 220 is pivotally attached to the tow element 180, the vertical position of the pivotal connection between engagement structure 199 and tow element 180 can be adjusted. Correspondingly, the vertical position of the forward end of device 10 is vertically adjusted.

Figure 8:
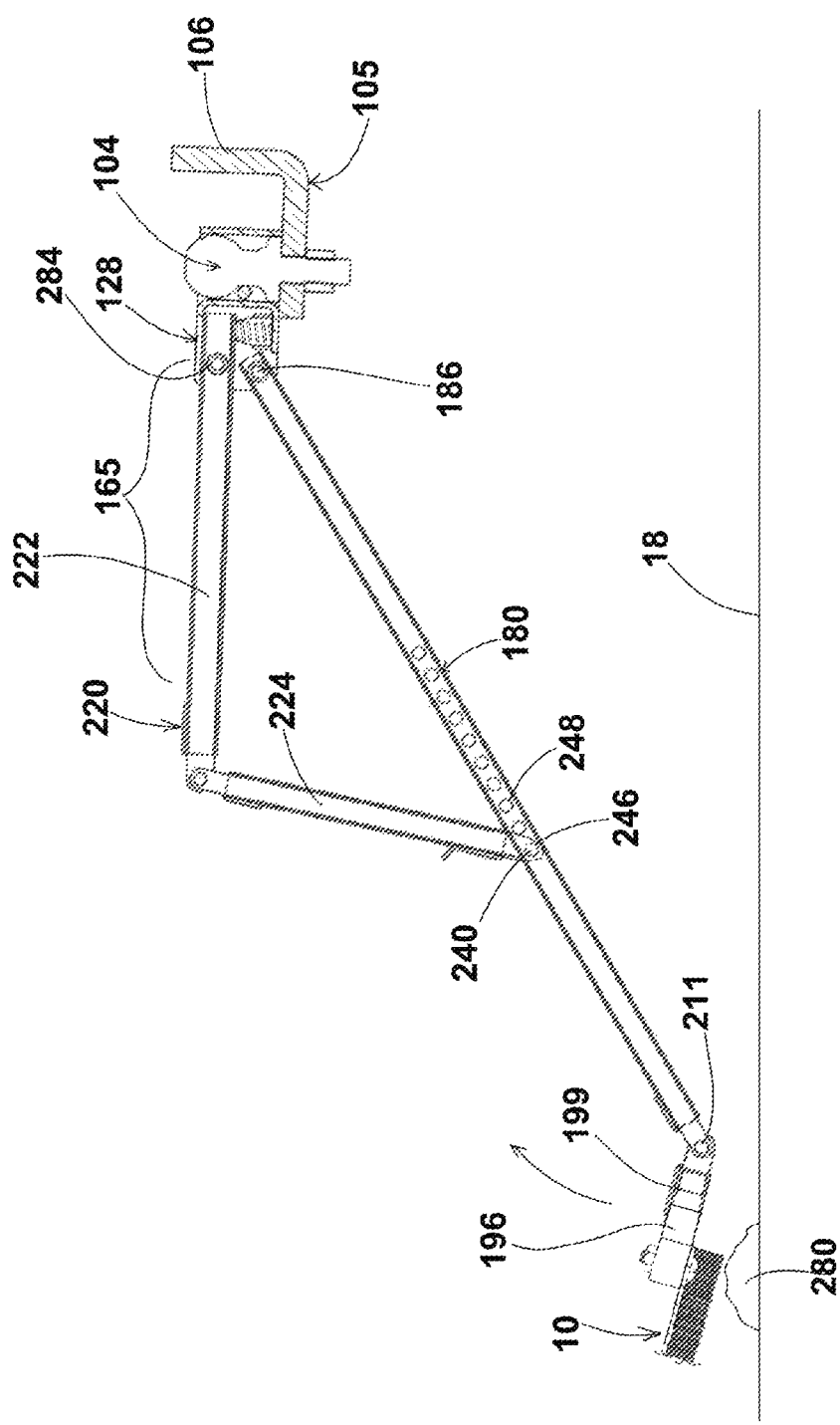
FIG. 8 is a view like FIG. 3 but showing the condition of the tow coupling on encounter by the towed debris collection device of FIG. 2 with an obstacle on the ground surface over which the debris collection device moves.

The spring 260 is selected such that it provides sufficient force to normally bias the coupling 100 so that the end part 222a of second arm 222 is resiliently urged against flange 138b of member 138 so that, in normal use, the vertical position of coupling 190 and the forward end of the device 10 is maintained at a position selected in accordance with the location at which the pin 240 is positioned along the length of tow element 180. That position of the arm 222 may, as shown in FIGS. 1 and 9 for example, be substantially horizontal. However, the spring 260 is also selected such that in the event that the forward end of the device 10 encounters an obstacle on the ground surface 18, when the device is towed over the ground surface, resultant upwards force on the device 10 will urge the coupling 190 and the lower end of first arm 224 upwardly so that the arm 222 is urged clockwise about the axis of pin 286 as viewed in FIG. 3. By this, the end part 222a of arm 222 is urged downwardly against the resilient bias provided by the spring 260. Accordingly, the device 10 is able to move upwardly against the applied resilient bias from spring 260, enabling the device 10 to move upwardly against the bias so as to permit the device 10 to be towed past the obstacle, to be returned to its rest position under that resilient bias after clearing the obstacle, and without causing material damage to the device 10 or coupling 100. FIG. 8 illustrates the condition of the coupling 100 on encountering an obstacle 280.

As mentioned, the device 10 may be simply attached via a convention tow hitch to a tow ball mounted to the rear of a vehicle by a conventional ball coupling and a trailing rope or the like connecting the tow ball and the front edge of the device 10. However, while that may permit substantial free rotational movement of the coupling to the tow ball about the vertical axis of the tow ball, it may also permit substantial pivoting of that coupling about an axis transverse to the tow ball axis 107, i.e. up and down pivoting about a horizontal axis. However, coupling 100 couples between the tow ball 104 and element 196 at the forward end of the device 10, so that the forward, towed, edge of the device 10 is biased to a particular, but adjustable, vertical position. This has been found to facilitate operation of the device 10. While that position is maintained in normal use, the device can still pivot to some extent about the axis of pin 211, to facilitate proper operation when the device 10 is towed over undulating terrain.

The magnetic coupling provided by magnets 200, 202 form parts of a releasable coupling 250 which has been found to provide a connection between the tow coupling 100 and the device 10 that is secure enough to enable normal operation of the device 10, whereas release of that coupling can occur when the device 10 encounters a substantial obstruction to its movement such as if a large heavy or fixed object on the ground surface is struck by device 10. By this release, it may be possible to avoid substantial damage to the device to tow coupling 100 to the ball coupling 105, or to the vehicle 102, that might otherwise result.

The releasable coupling 250 may be otherwise than a magnetic coupling. FIG. 12 shows a mechanical form of this coupling having a detent element 292 which is axially slidable in a tubular mount 295 secured at one end to the side wall 197a of tubular element 197 of coupling 190. One end of the tubular mount 295 is substantially closed by the side wall 197a of the tubular element 197 and the other end is closed by an end plug 294 threadedly mounted to that end. There is an opening 298 through wall 197a and an end part 290 of detent element 292 extends from the tubular mount 295 through that opening into an aligned opening 300 in the side wall of element 196. A helical compression spring 302 biases the detent element 292 away from end plug 294 to a position at which an outstanding peripheral flange 297 of the detent element is engaged with the wall 197a of tubular element 197. End part 290 of detent element 292 is of somewhat hemispherical form such that, while the elements 196, 197 are normally held in engagement by the positioning of the end part 290 of detent element 292 in opening 300 of element 196, the detent element 292 can be forced outwardly of the opening 300 under application of sufficient separating force between the elements 196, 197, such as under towing conditions when the device 10 encounters and an obstacle.

That occurs under camming action between the periphery of the opening 300 and the curved end surface of the end part 290 of detent element 292. In this way, release of the coupling so provided occurs under excess load towing conditions, as with the magnetic coupling described.

It was mentioned that the tow coupling 100, although constrained against pivotal movement with respect to the tow ball 104, is free to rotate about the vertical axis of the ball. Reference numerals 128A, 128B in FIG. 11 illustrate rotational; positions of the engagement part 128 at two exemplary such rotational positions of the coupling 100. Permitting this rotation is helpful to facilitate turning of the tow vehicle 102 and towed device 10.

It will be observed that, generally, the components of the tow coupling 100 extend in a common median plane, vertical in use, and that the various pivotal connections between these components are about axes transverse to that plane.

The compression spring 260 may be replaced by other forms of resilient means 270 such as a body of resiliently compressible material, e.g., rubber.

Releasable coupling 250 may be omitted, if provision for release of the device from the tow coupling 100 is not needed in case of obstruction of the movement of device 10.

The positioning structure 220 described generally has a locating means 165 (FIG. 10) for locating the arm 224 to vary its position. Locating means 165 is formed by arm 222 and co-operating parts of the engagement part 128, particularly flange 138b and part 222a of arm 222, and spring 260.

It will be appreciated from the above, and the drawings, that the tow element 180 and positioning structure 220 extend in cantilevered configuration from the engagement part 128 whereby, when the engagement part 128 is fitted to the ball coupling 105, the tow element 180 and positioning structure 220 extend in cantilevered configuration from the ball coupling 105, engagement part 128 is fitted to the ball coupling 105, from the ball coupling 105 and thus also from the vehicle 120. By this, the mentioned positioned of the interconnection between the tow element and the load coupling is settable in the upright direction, without the need to provide ground support for that interconnection.

The described construction has been advanced merely by way of example and many modifications and variations may be made without departing from the spirit and scope of the invention, which includes every novel feature and combination of features herein disclosed.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge.

The invention claimed is:

1. A tow coupling for fitting to an axially extending ball coupling mountable to a vehicle such that the axis of the ball coupling is upright with a ball of the ball coupling uppermost, the tow coupling having:
   an engagement part for engagement with the tow ball,
   a load coupling for coupling to a load to be towed, and
   a tow element interconnecting the engagement part and the load coupling and pivotally connected to the engagement part and to the load coupling,
   latching means for latching the engagement part in said engagement with the tow ball,
   said latching means for latching the engagement part in said engagement with the tow ball whereby to substantially confine movement of the coupling part when engaged with the tow ball to movement about said axis,
   interconnections between the load coupling and the tow element and between the engagement part and the tow element permitting pivoting, about transverse axes, between the load coupling and the tow element and between the engagement part and the tow element, and
   a positioning structure for positioning the tow element in a settable pivotal position with respect to the engagement part such that, when the engagement part is coupled to interconnect said vehicle and load, the pivotal position of the interconnection between the tow element and the load coupling is settable in the upright direction.

2. The tow coupling as claimed in claim 1, wherein said positioning structure has a first arm pivotally connectable to the tow element at any one of a plurality of locations along the direction of extent of the tow element from the engagement part, and locating means pivotally attached to the first arm for locating, at a set position, the pivotal connection of the first arm to the tow element, whereby said set position is established in accordance with the one of said plurality of locations at which the tow element is in use pivotally connected to the first arm.

3. The tow coupling as claimed in claim 2, wherein the tow element has a plurality of openings spaced therealong and the first arm has an opening at an end thereof, a pivot pin being receivably in the opening in the end of the first arm and in a selectable one of the openings in the tow element for effecting said pivotally connecting of the first arm to the tow element.

4. The tow coupling as claimed in claim 2, wherein said locating means comprises a second arm, pivotally connected to the first arm and to the engagement part at a location on the engagement part spaced from the location at which the tow element is pivotally connected to the engagement part, and resilient means for resiliently biasing the rotational position of the second arm with respect to the engagement means to a rest position, from which the second arm can be moved, against the resilient bias of the resilient means, in an upwards direction, when the engagement part is coupled to said vehicle and the load coupling is coupled to said load, under the condition that the load coupling and load move upwardly.

5. The tow coupling as claimed in claim 4, wherein said resilient means is positioned between the engagement part and an extension of said second arm past the pivotal interconnection of the second arm to the engagement part.

6. The tow coupling as claimed in claim 5 wherein the resilient means is a helical compression spring.

7. The tow coupling as claimed in claim 5 wherein the resilient compression means is a body of resiliently compressible material.

8. The tow coupling as claimed in claim 1, the load coupling having a releasable coupling interconnecting the load coupling and an engagement element connectable to the load.

9. The tow coupling as claimed in claim 8 wherein said load coupling is releasable on application of a predetermined separation force between the engagement element and the load coupling.

10. The tow coupling as claimed in claim 9 wherein the releasable coupling is a magnetic coupling having magnets respectively coupled to the engagement element and to another part of the load coupling the magnets being locatable in proximity to each other, the polarities of the magnets being arranged whereby, when located, they magnetically attract to provide said magnet coupling.

11. The tow coupling as claimed in claim 10 wherein said another part of the tow coupling includes a recess for receiving one said magnet, a second said magnet being carried by said engagement element.

12. The tow coupling as claimed in claim 1 wherein the engagement part has edges for engagement with a horizontal bracket part, carrying said ball, when the engagement part is in said engagement with the tow ball.

13. The tow coupling as claimed in claim 12, wherein the engagement part is in the form of a generally U-shaped bracket formed for engagement with the horizontal bracket part at locations to each lateral side of the tow ball when the engagement part is engaged with said tow ball.

14. The tow coupling as claimed in claim 1 wherein the tow element and positioning structure extend in cantilevered configuration from the engagement part whereby, when the engagement part is fitted to the ball coupling, the tow element and positioning structure extend in cantilevered configuration from the ball coupling.

15. In combination, a tow coupling as claimed in claim 1, coupled to a load for towing by said vehicle, the engagement part being in said engagement with the tow ball.

16. The combination of claim 15 wherein the load is a debris collection device having a planar member having openings therethrough, coupled to said vehicle for towing thereof over a ground surface such that debris on the ground surface passes upwardly through the openings to be collected on the device.

17. A tow coupling having an engagement part for engaging an upright ball coupling of a tow vehicle, to substantially confine movement of the tow coupling to movement about an upright axis of the ball coupling, a tow element pivotally connected to the engagement part and pivotally connected to an engagement structure connecting the tow element to a load to be towed, and positioning structure for positioning the engagement structure at a selectable vertical position when the engagement part is engaged with the ball coupling.

18. The tow coupling as claimed in claim 17, wherein the tow element and positioning structure are arranged for said positioning of the engagement structure without ground support of the engagement structure.

19. A vehicle having attached thereto a tow coupling for coupling a debris collection device to the vehicle for towing the debris collection device over a ground surface to collect debris from the ground surface, the tow coupling having a tow element pivotally mounted with respect to the vehicle in a manner substantially limiting pivotal movement of the tow element to movement about a vertical axis, the tow coupling having, at an end of the tow element remote from the vehicle, a load coupling for connection to the debris collection device, the tow coupling having positioning structure for positioning the tow element vertically, whereby to selectively set the vertical position of the load coupling.

20. The vehicle as claimed in claim 19, wherein said positioning structure has a first arm pivotally connectable to the tow element at any one of a plurality of locations along the direction of extent of the tow element, and locating means pivotally attached to the first arm for locating, at a selected said location, the pivotal connection of the first arm to the tow element, whereby said vertical position of the load coupling is established in accordance with the one of said plurality of locations at which the tow element is pivotally connected to the first arm.

21. The vehicle as claimed in claim 20, wherein the tow element has a plurality of openings spaced there along and the first arm has an opening at an end thereof, a pivot pin being receivable in the opening in the end of the first arm and in a selectable one of the openings in the tow element for effecting the pivotal connection of the first arm to the tow element.

22. The vehicle as claimed in claim 21, wherein said positioning structure has a second arm, pivotally connected at an end to the first arm, and pivotally connected at another end for pivotal movement relative to the vehicle at a location spaced from the location at which the tow element is pivotally mounted to the vehicle, and resilient means for resiliently biasing the pivotal position of the second arm with respect to the vehicle to a rest position, from which the second arm can be moved, against the resilient bias of the resilient means, in an upwards direction under the condition that the load coupling and the debris collection device move upwardly.

23. The vehicle as claimed in claim 22, wherein said resilient means is positioned to act on an extension of said second arm past the pivotal connection of the second arm relative to the vehicle.

24. The vehicle as claimed in claim 23, wherein the resilient means is a helical compression spring.

25. The vehicle as claimed in claim 23, wherein the resilient compression means is a body of resiliently compressible material.

26. The vehicle as claimed in claim 19, the load coupling having a releasable coupling interconnecting the load coupling and an engagement element connected to the debris collection device.

27. The vehicle as claimed in claim 19, wherein the tow element and positioning structure extend in cantilevered configuration from the vehicle.

28. The vehicle as claimed in claim 19, wherein the tow element and positioning structure are arranged to set the position of the load coupling without ground support of the load coupling.

29. A vehicle having attached thereto a tow coupling for coupling a load to the vehicle for towing the load over a ground surface, the tow coupling having a tow element pivotally mounted with respect to the vehicle in a manner substantially limiting pivotal movement of the tow element to movement about a vertical axis, the tow coupling having, at an end of the tow element remote from the vehicle, a load coupling for connection to the load, the tow coupling having positioning structure for positioning the tow element vertically, whereby to selectively set the vertical position of the load coupling.

30. A tow coupling for fitting to an axially extending ball coupling mountable to a vehicle such that the axis of the ball coupling is upright with a ball of the ball coupling uppermost, the tow coupling having:
an engagement part for engagement with the tow ball,
a load coupling for coupling to a load to be towed, and
a tow element interconnecting the engagement part and the load coupling and pivotally connected to the engagement part, latching means for latching the engagement part in said engagement with the tow ball, an interconnection between the engagement part and the tow element permitting pivoting, about a transverse axis, between the engagement part and the tow element, and a positioning structure for positioning the tow element in a settable pivotal position with respect to the engagement part such that, when the engagement part is engaged with the tow ball, the position of the load coupling is settable in the upright direction dependent on the settable pivotal position of the tow element, wherein the positioning structure having resilient means for resiliently biasing the tow element to said settable pivotal position, but permitting pivotal movement of the tow element, against the resilient biasing, whereby to permit the load coupling to move in an upwards direction, when the engagement part is coupled to said vehicle, the load coupling is coupled to said load, and the vehicle tows the load, and the load encounters an obstacle.

31. The tow coupling as claimed in claim 30 wherein the resilient means is a helical compression spring.

32. The tow coupling as claimed in claim 30 wherein the resilient compression means is a body of resiliently compressible material.

* * * * *